(12) United States Patent
Kim et al.

(10) Patent No.: US 9,715,137 B2
(45) Date of Patent: Jul. 25, 2017

(54) LIQUID CRYSTAL DISPLAY DEVICE USING IN-CELL TOUCH MODE AND METHOD FOR MANUFACTURING THE SAME

(71) Applicant: LG Display Co., Ltd., Seoul (KR)

(72) Inventors: JinSeong Kim, Gyeonggi-do (KR); CheolSe Kim, Daegu (KR); JuHan Kim, Gyeonggi-do (KR); SungChul Kim, Gyeonggi-do (KR); SangHyuck Bae, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/980,174

(22) Filed: Dec. 28, 2015

(65) Prior Publication Data

US 2016/0187696 A1   Jun. 30, 2016

(30) Foreign Application Priority Data

Dec. 30, 2014 (KR) ........................ 10-2014-0194190

(51) Int. Cl.
*G02F 1/1333* (2006.01)
*G02F 1/1335* (2006.01)
(Continued)

(52) U.S. Cl.
CPC .......... *G02F 1/13338* (2013.01); *G06F 3/044* (2013.01); *G06F 3/0412* (2013.01);
(Continued)

(58) Field of Classification Search
None
See application file for complete search history.

(56) References Cited

U.S. PATENT DOCUMENTS

| 6,239,788 B1 | 5/2001 | Nohno et al. |
| 2003/0058379 A1* | 3/2003 | Lee ..................... G02F 1/13458 349/43 |

(Continued)

FOREIGN PATENT DOCUMENTS

| JP | H11305932 A | 11/1999 |
| KR | 10-2008-0047332 A | 5/2008 |

OTHER PUBLICATIONS

Office Action dated Aug. 11, 2016, for corresponding Korean Patent Application No. 10-2014-0194190.

(Continued)

*Primary Examiner* — Ryan Crockett
(74) *Attorney, Agent, or Firm* — Morgan, Lewis & Bockius LLP

(57) ABSTRACT

A liquid crystal display (LCD) device includes a lower substrate and an upper substrate disposed to face each other and having a liquid crystal layer interposed therebetween, black matrices provided on the lower substrate, a color filter provided between the black matrices, and a common electrode provided on the entire surface of the lower substrate, a gate line and a data line provided on the upper substrate and intersect with each other to define a pixel area, a thin film transistor (TFT) present in the pixel area of the upper substrate, and a pixel electrode electrically in contact with the TFT, wherein a sensing signal is output by detecting a change in self-capacitance between a touch object contacting the upper substrate and the gate line and the data line.

6 Claims, 5 Drawing Sheets

(51) Int. Cl.
*G02F 1/1362* (2006.01)
*G02F 1/1368* (2006.01)
*G06F 3/041* (2006.01)
*G06F 3/044* (2006.01)

(52) U.S. Cl.
CPC ............... *G02F 1/136286* (2013.01); *G06F 2203/04103* (2013.01)

(56) References Cited

U.S. PATENT DOCUMENTS

| | | | | |
|---|---|---|---|---|
| 2011/0025635 A1* | 2/2011 | Lee | ............... | G06F 1/3203 345/173 |
| 2013/0293498 A1* | 11/2013 | Kim | ............... | G06F 3/0412 345/173 |
| 2015/0338711 A1* | 11/2015 | Chang | ............... | G02F 1/136277 257/91 |

OTHER PUBLICATIONS

Office Action dated Apr. 25, 2017, from the Korean Patent Office in counterpart Korean Patent Application No. 10-2014-0194190.

* cited by examiner

LIQUID CRYSTAL DISPLAY DEVICE USING IN-CELL TOUCH MODE AND METHOD FOR MANUFACTURING THE SAME

CROSS-REFERENCE TO RELATED APPLICATION

Pursuant to 35 U.S.C. §119(a), this application claims the benefit of earlier filing date and right of priority to Korean Application No. 10-2014-0194190, filed on Dec. 30, 2014, the contents of which is incorporated by reference herein in its entirety.

BACKGROUND OF THE INVENTION

1. Field of the Invention

The present disclosure relates to a liquid crystal display (LCD), and more particularly, to an LCD using an in-cell touch mode and a manufacturing method thereof.

2. Discussion of the Related Art

Specific examples of flat panel displays include an LCD, a plasma display panel (PDP) device, a field emission display (FED) device, and an electroluminescence display device (ELD). These devices commonly include a flat display panel as an essential element, and the flat display panel has a structure in which a pair of transparent insulating substrates are attached in a facing manner with an emission or polarization material layer interposed therebetween.

Among them, the LCD displays an image by adjusting light transmittance of liquid crystal by using an electric field. To this end, an image display device includes a display panel having a liquid cell, a backlight unit irradiating light to the display panel, and a driving circuit for driving the liquid crystal cell.

Recently, demand for adding a touch panel which recognizes a touched portion through a user's hand or a separate input unit and transmits separate information corresponding thereto has increased. Currently, such a touch panel is applied in a form of being attached to an external surface of a display device.

Also, according to a touch sensing scheme, a touch panel is classified as a resistive touch panel, a capacitive touch panel, and an infrared sensing type touch panel, and recently, in consideration of ease in manufacturing scheme and sensing power, the capacitive touch panel, as a small mode, has come to prominence.

As the capacitive scheme, a mutual capacitive sensing scheme is used in order to recognize a multi-touch.

Among touch sensors using the capacitive sensing scheme, an in-cell touch type touch sensor has recently emerged. Here, the in-cell touch type touch sensor is a technique of implementing a touch operation by forming a touch sensor on a lower substrate.

Recently, the in-cell touch technique is applied to LCDs in various driving modes.

The in-cell touch sensors using the capacitive scheme has a limitation in application to a TN mode LCD among LCDs in various driving modes.

The reason is because, the TN mode LCD has a structure in which a gate electrode, an active layer, source and drain electrodes, and a pixel electrode are formed on a lower substrate and a black matrix, a color filter, a common electrode, and a columnar spacer are formed on an upper substrate.

Thus, in a case in which the in-cell touch scheme is applied to the TN mode LCD, when a user touches an upper portion of a color filter, a touch signal is blocked by the common electrode provided on an upper substrate of a TN panel, making it difficult to implement a touch function. Also, there is a difficulty in configuring a touch electrode, while maintaining the TN structure within a lower substrate.

SUMMARY OF THE INVENTION

Accordingly, the present invention is directed to a liquid crystal display (LCD) device using an in-cell touch mode and a method of manufacturing the same that substantially obviates one or more of the problems due to limitations and disadvantages of the related art An object of the present invention is to provide a liquid crystal display (LCD) device using an in-cell touch scheme capable of applying a self-capacitance type in-cell touch sensor to a twisted nematic (TN) mode LCD, and a manufacturing method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of this specification, as embodied and broadly described herein, a liquid crystal display (LCD) device may comprise a lower substrate and an upper substrate disposed to face each other and having a liquid crystal layer interposed therebetween; black matrices provided on the lower substrate, a color filter provided between the black matrices, and a common electrode provided on the entire surface of the lower substrate; a gate line and a data line provided on the upper substrate and intersect with each other to define a pixel area; a thin film transistor (TFT) present in the pixel area of the upper substrate; and a pixel electrode electrically in contact with the TFT, wherein a sensing signal is output by detecting a change in self-capacitance between a touch object contacting the upper substrate and the gate line and the data line.

In another aspect, a method for manufacturing a liquid crystal display (LCD) device may comprise providing a lower substrate and an upper substrate disposed to face each other and having a liquid crystal layer provided therebetween; forming a black matrix, a color filter, and a common electrode on the lower substrate; forming a gate line, an active layer, a source/drain electrode, and a data line intersecting with the gate line to form a pixel area on the upper substrate; and forming a pixel electrode electrically in contact with the drain electrode in the pixel area of the upper substrate, wherein a sensing signal is output by detecting a change in self-capacitance between a touch object contacting the upper substrate and the gate line and the data line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE ILLUSTRATED EMBODIMENTS

Figure 1:
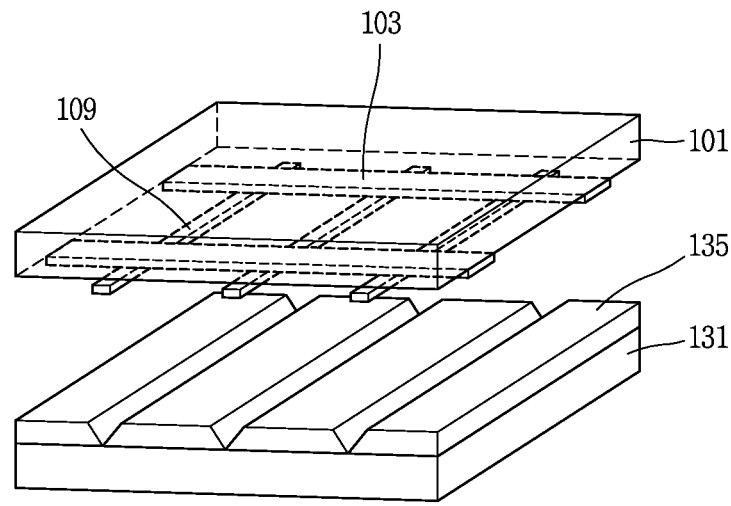
FIG. 1 is a perspective view of a liquid crystal display (LCD) device using an in-cell touch scheme according to an embodiment of the present disclosure.

Hereinafter, embodiments of the present disclosure will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

In describing the elements of the present invention, terms such as first, second, A, B, (a), (b), etc., may be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it can be directly on or directly connected to the other element or layer, or intervening elements or layers may be present. In the same context, it will be understood that when an element is referred to as being "on" or "beneath" another element, the element can be directly on the other element or indirectly formed with an intervening element therebetween.

Figure 2:
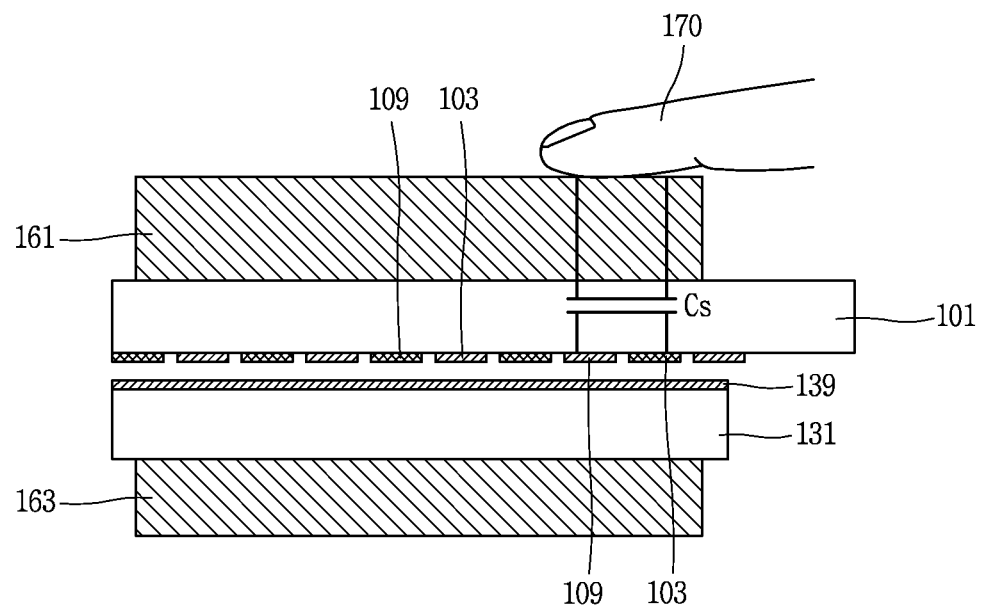
FIG. 2 is a cross-sectional view of an LCD using an in-cell touch scheme according to an embodiment of the present disclosure, illustrating self-capacitance between a touch object and a gate line and a data line.
Figure 3:
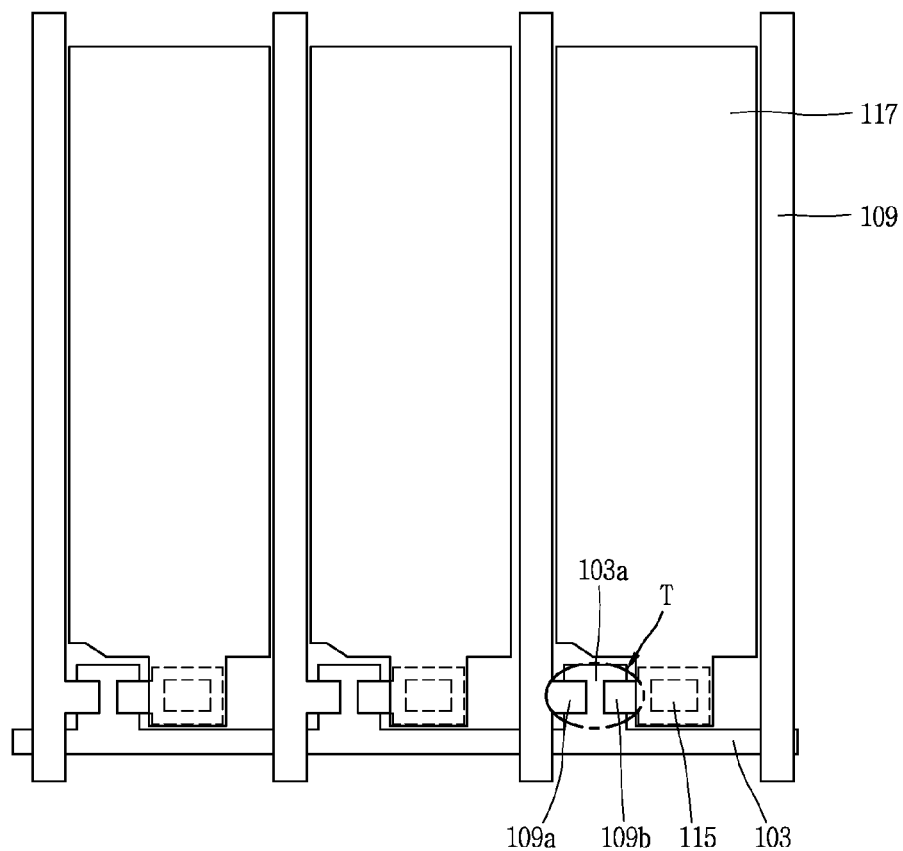
FIG. 3 is a plan view of an LCD using an in-cell touch scheme according to an embodiment of the present disclosure.
Figure 4:
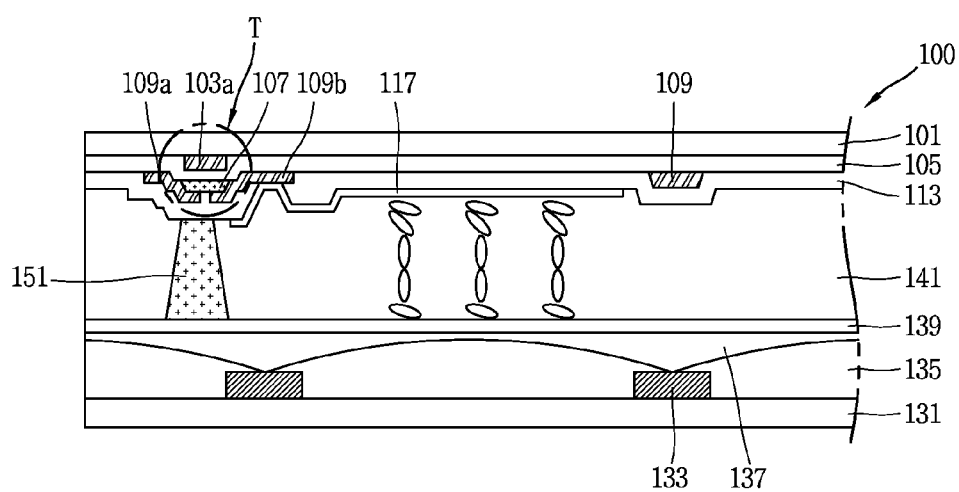
FIG. 4 is a schematic cross-sectional view of an LCD using an in-cell touch scheme according to an embodiment of the present disclosure.
Figure 5:
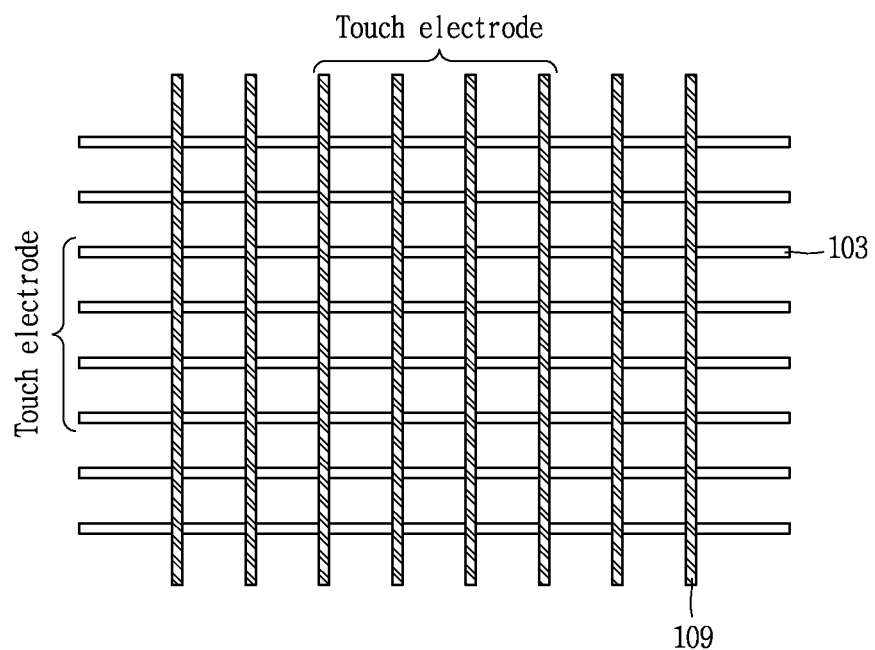
FIG. 5 is a view schematically illustrating gate lines and data lines of an LCD using an in-cell touch scheme according to an embodiment of the present disclosure.
Figure 6:
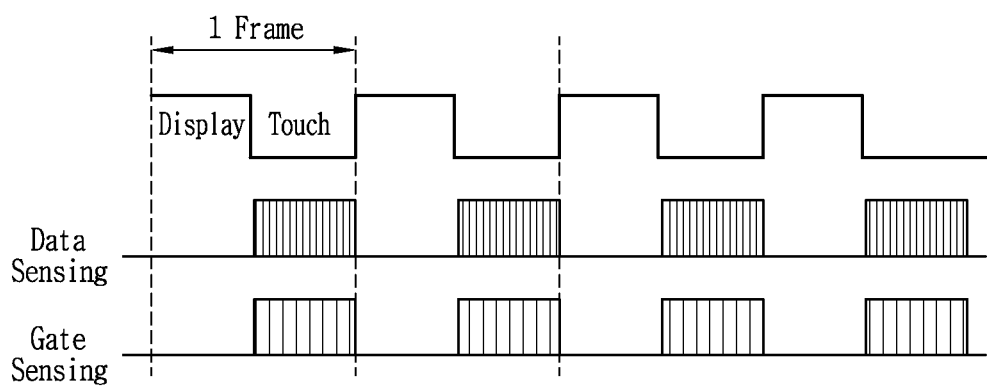
FIG. 6 is a circuit waveform view schematically illustrating a driving scheme of an LCD using an in-cell touch scheme according to an embodiment of the present disclosure, in which circuit waveforms in a display section and a touch section based on a time division scheme are illustrated.

FIG. 1 is a perspective view of a liquid crystal display (LCD) device using an in-cell touch scheme according to an embodiment of the present disclosure. FIG. 2 is a cross-sectional view of an LCD using an in-cell touch scheme according to an embodiment of the present disclosure, illustrating self-capacity between a touch object and a gate line and a data line. FIG. 3 is a plan view of an LCD using an in-cell touch scheme according to an embodiment of the present disclosure. FIG. 4 is a schematic cross-sectional view of an LCD using an in-cell touch scheme according to an embodiment of the present disclosure. FIG. 5 is a view schematically illustrating gate lines and data lines of an LCD using an in-cell touch scheme according to an embodiment of the present disclosure. FIG. 6 is a circuit waveform view schematically illustrating a driving scheme of an LCD using an in-cell touch scheme according to an embodiment of the present disclosure, in which circuit waveforms in a display section and a touch section based on a time division scheme are illustrated.

As illustrated in FIGS. 1 and 2, an LCD device using an in-cell touch scheme according to an embodiment of the present disclosure includes an upper substrate 101 including gate lines 103 and data lines 19 intersecting with each other and a lower substrate 131 disposed to face the upper substrate 101 and having a plurality of color filters 135 and a common electrode 139.

An upper polarizer 161 and a lower polarizer 163 are provided on the upper substrate 101 and the lower substrate 131, respectively.

The upper substrate 101 including a thin film transistor (TFT) array is termed a TFT array substrate, and the lower substrate 131 including the color filters and the common electrode is termed a color filter array substrate.

As illustrated in FIG. 2, on the basis of self-capacitance between a touch object 170 contacting the upper substrate 101 and the gate line 103 and the data line 109 provided in the upper substrate 101, a change in the self-capacitance before and after the touch is sensed to detect the touch.

FIG. 3 is a plan view of an LCD using an in-cell touch scheme according to an embodiment of the present disclosure, and FIG. 4 is a schematic cross-sectional view of an LCD using an in-cell touch scheme according to an embodiment of the present disclosure.

FIG. 3 is a view illustrating an upper array substrate of the LCD using the in-cell touch scheme according to an embodiment of the present disclosure. In the upper substrate (not shown and please refer to 101 of FIG. 4), the gate line 103 and the data line 109 are arranged to intersect with each other to define a pixel area, a TFT T is provided at the intersection of the lines 103 and 109, and a pixel electrode 117 is provided in each pixel area and electrically in contact with a drain electrode 109b of the TFT T.

The LCD device 100 using the in-cell touch scheme according to an embodiment of the present disclosure is an LCD device having a TN structure, and as illustrated in FIGS. 3 and 4, the LCD device 100 includes an upper substrate 101 and a lower substrate 131 disposed to face each other and a liquid crystal layer 141 provided between the substrates 101 and 131.

On the upper substrate 101, the gate line 103 is formed in one direction and a gate electrode 103a extends from the gate line 103.

A gate insulating layer 105 is formed on the entire surface of the upper substrate 101 including the gate electrode 103a and the gate line 103.

A semiconductor layer 107 and separated ohmic contact layers (not shown) are stacked on the gate insulating layer 150 above the gate electrode.

A source electrode 109a and drain electrode 109b are separately formed on the semiconductor layer 107 and the ohmic contact layers (not shown). Here, a data line (not shown, please refer to 109 of FIG. 3) extends from the source electrode 109a, and the data line 109 is formed in the other direction intersecting with the gate line 103.

The gate electrode 103a, the semiconductor layer 107, the source electrode 109a, and the drain electrode 109b form the TFT T.

A protective layer 113 is formed on the entire surface of the upper substrate 101 including the source electrode 109a and the drain electrode 109b.

A drain contact hole (not shown, please refer to 115 of FIG. 7C) exposing a portion of the drain electrode 109b of the TFT T is formed in the protective layer 113.

A pixel electrode 117 is formed on the protective layer 113 including the drain contact hole 115a and electrically in contact with the drain electrode 109b. Here, the pixel electrode 117 is formed in every pixel area (not shown) formed as the gate line 103 and the data line 109 intersect with each other.

An upper alignment layer (not shown) may be formed on an upper surface of the upper substrate 101 including the pixel electrode 117.

Meanwhile, a black matrix 133 is formed in an area of the lower substrate 131, excluding the pixel area (not shown), attached to the upper substrate 101 with a predetermined cell gap therebetween in a facing manner.

Color filter 135 including red, green, and blue color filter layers is formed on the lower substrate 131 corresponding to the pixel area between the black matrices 133.

An overcoat layer 137 is formed on the lower substrate 131 including the color filter 135 and the black matrix 133. Here, the overcoat layer 137 serves to planarize a surface of the lower substrate 101.

A common electrode 139 is formed on the entire surface of the overcoat layer 137.

A columnar spacer (not shown) is formed on the common electrode 139 to maintain a predetermined cell gap when the upper substrate 101 and the lower substrate 131 are attached. Here, the columnar spacer (not shown) may be formed in a position overlapping the TFT T, the gate line 103, or the data line 109 within the pixel area.

An upper alignment layer (not shown) may be formed on the entire surface of the lower substrate 101.

A liquid crystal layer (not shown) is formed between the upper substrate 101 and the lower substrate 131 in which the predetermined cell gap is maintained by the columnar spacer (not shown).

As a seal pattern 151 is formed along outer edge portions of the upper substrate 101 and the lower substrate 131 therebetween, the upper substrate 101 and the lower substrate 131 are attached.

FIG. 5 is a view schematically illustrating gate lines and data lines of an LCD using an in-cell touch scheme according to an embodiment of the present disclosure.

As illustrated in FIG. 5, the gate line 103 and the data line 109 of the upper substrate 101 are used as a gate electrode and a data electrode when the LCD device is driven, and in a case in which a touch object (not shown, please refer to 170 of FIG. 2) contacts on the upper substrate 101, the gate line 103 and the data line 109 are used as electrodes an in-cell touch sensor, that is, as a gate electrode and a data electrode. That is, when the touch object 170 contacts the upper substrate 101, a change in capacitance between the touch object 170 and the gate electrode and the data electrode sensed and a sensing signal is output.

FIG. 6 is a circuit waveform view schematically illustrating a driving scheme of an LCD using an in-cell touch scheme according to an embodiment of the present disclosure, in which circuit waveforms in a display section and a touch section based on a time division scheme are illustrated.

As illustrated in FIG. 6, the LCD device using an in-cell touch scheme according to an embodiment of the present disclosure is driven in a time division manner. That is, in a display section, the gate line 103 and the data line 109 may be used as electrodes of the LCD device, and in a touch section, the gate line 103 and the data line 109 may be used as electrodes of the self-capacitance sensor.

Thus, the gate line 103 and the data line 109 may sense a variation in self-capacitance according to the presence and absence of a touch applied by the touch object 170.

A method for manufacturing an LCD device using the in-cell touch scheme according to an embodiment of the present disclosure configured as described above will be described with reference to FIGS. 7 through 9.

FIGS. 7A through 7D are cross-sectional views illustrating a process of manufacturing an upper thin film transistor (TFT) array substrate of an LCD using an in-cell touch scheme according to an embodiment of the present disclosure.

Figure 7A:
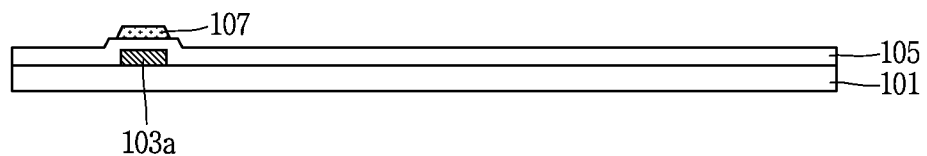
FIGS. 7A through 7D are cross-sectional views illustrating a process of manufacturing an upper thin film transistor (TFT) array substrate of an LCD using an in-cell touch scheme according to an embodiment of the present disclosure.

In the method for manufacturing the upper TFT array substrate of an LCD device using an in-cell touch scheme according to an embodiment of the present disclosure, first, as illustrated in FIG. 7A, a gate metal layer (not shown) is formed on an upper substrate 101 through a deposition method such as sputtering deposition method, or the like. Here, as the gate metal layer (not shown), a monolayer or a dual-layer structure formed of a chromium (Cr) or molybdenum (Mo) alloy may be used.

Next, the gate metal layer (not shown) is patterned through a photolithography process and an etching process to form a gate line (not shown, please refer to 103 of FIG. 3) and a gate electrode 103a extending from the gate line 103.

Thereafter, a gate insulating layer 150 is formed on the upper substrate 101 with the patterns formed thereon through a deposition method such as PECVD or sputtering. Here, as a material of the gate insulating layer 105, an inorganic insulating material such as silicon oxide (SiOx) or silicon nitride (SiNx) may be used.

Thereafter, an amorphous silicon layer (not shown) and an n+ amorphous silicon layer (not shown) are sequentially formed on the gate insulating layer 105.

Thereafter, the n+ amorphous silicon layer (not shown) and the amorphous silicon layer (not shown) are patterned through a photolithography process and an etching process to form a semiconductor layer 107 and an ohmic contact layer (not shown).

Figure 7B:
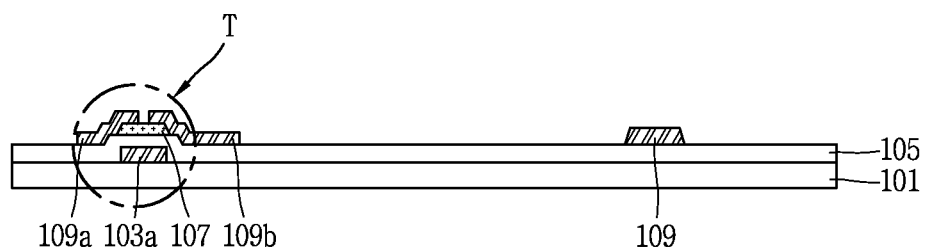

Thereafter, as illustrated in FIG. 7B, a source/drain metal layer (not shown) is formed on the entire surface of the lower substrate 101 including the ohmic contact layer (not shown) and the semiconductor layer 107 and subsequently patterned through a photolithography process and an etching process to form a data line (not shown, please refer to 109 of FIG. 3) intersecting with the gate line 103 and separated source electrode 109a and drain electrode 109b. Here, as the source/drain metal layer (not shown), molybdenum (Mo), titanium (Ti), tantalum (Ta), or a molybdenum (Mo) alloy is used. Thus, the gate electrode 103, the semiconductor layer 107, the source electrode 109a and the drain electrode 109b form a TFT T.

Figure 7C:
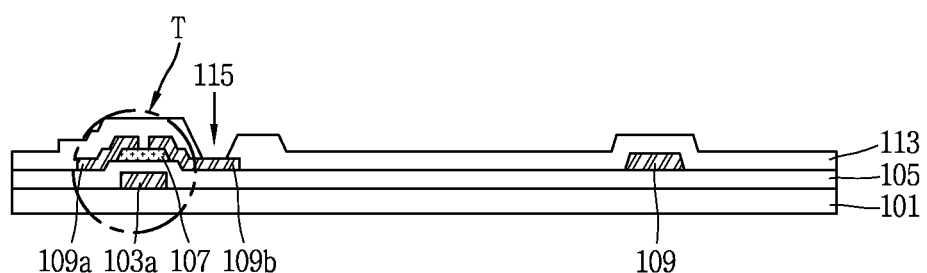

Thereafter, as illustrated in FIG. 7C, a protective layer 113 is formed on the gate insulating layer 105 including the source electrode 109a and the drain electrode 109b through a deposition method such as PECVD. Here, as a material of the protective layer 113, an inorganic insulating material such as a silicon oxide (SiOx) or a silicon nitride (SiNx) may be used.

Thereafter, the protective layer 113 is sequentially patterned through a photolithography process and an etching process to form a drain contact hole 115 exposing a portion of the drain electrode 109b.

Thereafter, a transparent electrode material layer (not shown) is deposited on the protective layer 113 including the drain contact hole 115 through a deposition method such as sputtering, or the like.

Figure 7D:
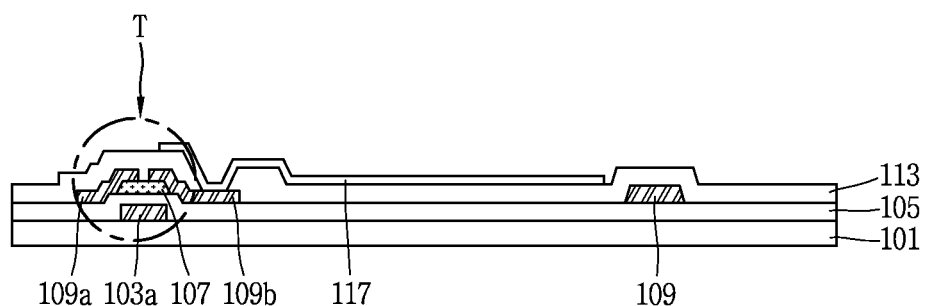

Thereafter, as illustrated in FIG. 7D, the transparent electrode material layer (not shown) is patterned through a photolithography process and an etching process to form a pixel electrode 117 in contact with the drain electrode 109b. here, as a material of the transparent electrode material layer, an indium tin oxide (ITO), a tin oxide (TO), or an indium zinc oxide (IZO) may be used. The pixel electrode 125 is formed in every pixel area (not shown) formed as the gate line 103 and the data line 109 intersect with each other.

Thereafter, although not shown, aligning is performing on the entire surface of the upper substrate 101 including the pixel electrode 125 to form an upper alignment layer (not shown).

Figure 8A:
FIGS. 8A through 8C are cross-sectional views illustrating a process of manufacturing a lower TFT array substrate of an LCD using an in-cell touch scheme according to an embodiment of the present disclosure.
Figure 8B:
Figure 8C:
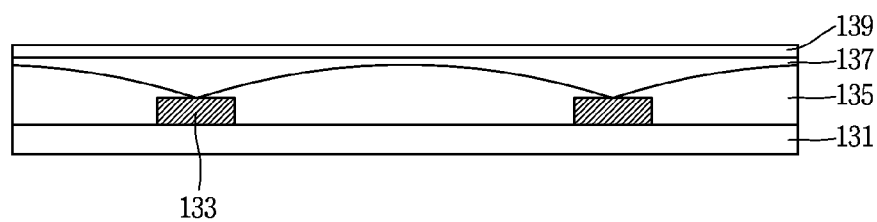

FIGS. 8A through 8C are cross-sectional views illustrating a process of manufacturing a lower TFT array substrate of an LCD using an in-cell touch scheme according to an embodiment of the present disclosure.

In the method for manufacturing a lower color filter array substrate of an LCD device using an in-cell touch scheme according to an embodiment of the present disclosure, first, as illustrated in FIG. 8A, a black matrix 133 is formed on a lower substrate 101 corresponding to an area of the lower substrate 131 excluding a pixel area.

Next, as illustrated in FIG. 8B, a color filter 135 including red, green, and blue color filter layers (not shown) is formed on the lower substrate 131 corresponding to the pixel region (not shown) between the black matrices 133.

Thereafter, as illustrated in FIG. 8C, an overcoat layer 137 is formed on the black matrix 133 including the color filter 135 to planarize a surface of the lower substrate 131.

Thereafter, as illustrated in FIG. 8C, a transparent electrode material layer (not shown) is deposited on the entire surface of the overcoat layer 137 to form a common electrode 139. Here, as a material of the transparent electrode material layer, an ITO, a TO, or an IZO may be used.

Thereafter, a columnar spacer (not shown) is formed on the common electrode 139 such that a cell gap may be maintained between the lower substrate 131 and the upper substrate 101. here, the columnar spacer (not shown) may be formed in a position in which the columnar spacer overlaps the TFT T, the gate line (not shown, please refer to 103 of FIG. 3), or the data line (not shown, please refer to 109 of FIG. 3).

Thereafter, a lower alignment layer (not shown) may be formed on an exposed surface of the lower substrate 131 including the columnar spacer (not shown) and the common electrode 139.

Figure 9:
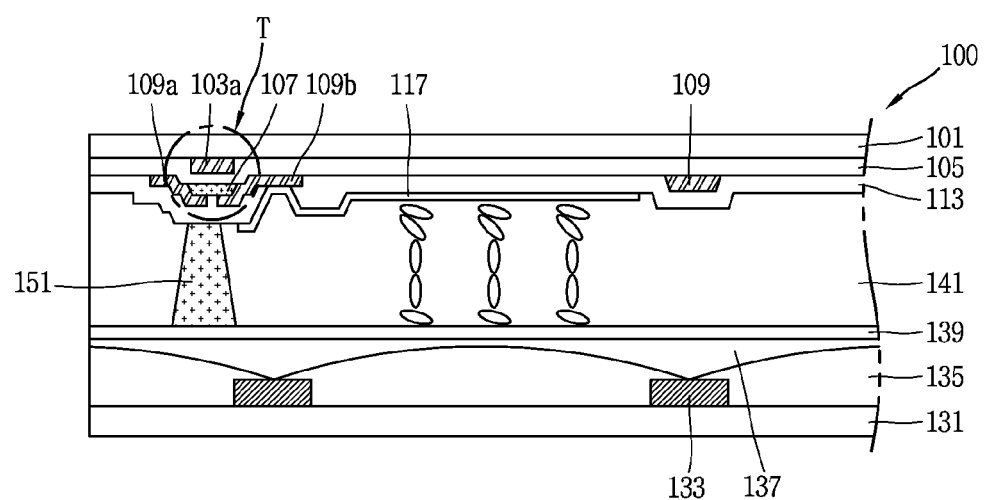
FIG. 9 is a cross-sectional view illustrating an attached state of an upper substrate and a lower substrate of an LCD using an in-cell touch scheme according to an embodiment of the present disclosure.

FIG. 9 is a cross-sectional view illustrating an attached state of an upper substrate and a lower substrate of an LCD using an in-cell touch scheme according to an embodiment of the present disclosure.

As illustrated in FIG. 9, a liquid crystal layer 141 is formed between the lower substrate 131 and the upper substrate 101.

Thereafter, a seal pattern 151 is formed on the outer edges of the upper substrate 101 and the lower substrate 131 and the upper substrate 101 and the lower substrate 131 are attached to complete the process of manufacturing the in-cell touch type LCD device having a TN structure according to an embodiment of the present disclosure.

In this manner, in the LCD device using the in-cell touch scheme and the method for manufacturing the same according to an embodiment of the present disclosure, since the time division driving scheme in which the gate line and the data line of the TFT are used as a gate electrode and a data electrode in a display section and used as touch electrodes in a touch section, a self-capacitance type in-cell touch sensor may be implemented.

In the LCD device using an in-cell touch scheme and the manufacturing method thereof according to the embodiments of the present disclosure, by applying the time division scheme in which the gate line and the data line are used as a gate electrode and a data electrode in a display section and used as touch electrodes in a touch section, a self-capacitance type in-cell touch sensor may be implemented.

In addition, In the LCD device using an in-cell touch scheme and the manufacturing method thereof according to the embodiments of the present disclosure, by applying the self-capacitance type in-cell touch technique to the LCD device, an added value of the LCD device may be increased, and the in-cell touch technique may be implemented in an existing LCD device having a TN structure without increasing the number of masks.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
a lower substrate and an upper substrate disposed to face each other and having a liquid crystal layer interposed therebetween;
black matrices provided on the lower substrate, a color filter provided between the black matrices, and a common electrode provided on the entire surface of the lower substrate;
a gate line and a data line provided on the upper substrate and intersect with each other to define a pixel area; a thin film transistor (TFT) present in the pixel area of the upper substrate; and
a pixel electrode electrically in contact with the TFT,
wherein a sensing signal is output by detecting a change in self-capacitance between a touch object contacting the upper substrate and the gate line and the data line, and
wherein the gate line and the data line are used as electrodes of the LCD device in a display section, and are used as self-capacitance sensors in a touch section.

2. The LCD device of claim 1, wherein the LCD device is an in-cell touch mode LCD device having a TN structure.

3. The LCD device of claim 1, wherein the gate line and the data line sense a variation in self-capacitance according to the presence and absence of the touch object on the upper substrate.

4. A method for manufacturing a liquid crystal display (LCD) device, the method comprising:
providing a lower substrate and an upper substrate disposed to face each other and having a liquid crystal layer provided therebetween;

forming a black matrix, a color filter, and a common electrode on the lower substrate;

forming a gate line, an active layer, a source/drain electrode, and a data line intersecting with the gate line to form a pixel area on the upper substrate; and forming a pixel electrode electrically in contact with the drain electrode in the pixel area of the upper substrate, wherein a sensing signal is output by detecting a change in self-capacitance between a touch object contacting the upper substrate and the gate line and the data line, and wherein the gate line and the data line are used as electrodes of the LCD device in a display section, and are used as self-capacitance sensors in a touch section.

5. The method of claim 4, wherein the LCD device is an in-cell touch mode LCD device having a TN structure.

6. The method of claim 4, wherein the gate line and the data line sense a variation in self-capacitance according to the presence and absence of the touch object on the upper substrate.

* * * * *